United States Patent [19]

Valkovich et al.

[11] Patent Number: 4,973,733

[45] Date of Patent: Nov. 27, 1990

[54] METHOD OF FUNCTIONALIZING POLYMERS

[75] Inventors: Phillip B. Valkovich, Spring, Tex.; Kechia J. Chou, Wappingers Falls, N.Y.

[73] Assignee: Texaco Inc., White Plains, N.Y.

[21] Appl. No.: 12,229

[22] Filed: Feb. 9, 1987

[51] Int. Cl.$^5$ .............. C07C 209/60; C07C 227/18; C07C 229/30; C07C 269/08; C07C 211/19
[52] U.S. Cl. ...................... 560/24; 252/47.5; 260/401; 260/404; 260/404.5; 560/12; 560/25; 560/115; 560/149; 560/157; 560/158; 560/171; 560/172; 562/37; 562/104; 564/90; 564/92; 564/509
[58] Field of Search .............. 560/24, 25, 157, 158, 560/171, 172, 12, 115, 149; 260/513.6, 401, 404, 404.5; 564/509, 90, 92; 562/37, 104

[56] References Cited

U.S. PATENT DOCUMENTS

| | | | |
|---|---|---|---|
| 3,277,098 | 10/1966 | Merten | 560/158 X |
| 3,478,100 | 11/1969 | Gale | 564/509 X |
| 4,144,181 | 3/1979 | Elliott | 252/47.5 |

Primary Examiner—Vivian Garner
Attorney, Agent, or Firm—Robert A. Kulason; Carl G. Seutter

[57] ABSTRACT

Polymers, such as polyisobutylene or ethylene-propylene copolymers, are functionalized by reaction with an activated imine to yield novel polymers.

17 Claims, No Drawings

METHOD OF FUNCTIONALIZING POLYMERS

This is a division, of application Ser. No. 686,162, filed 24 Dec. 1984, now U.S. Pat. No. 4,659,491.

FIELD OF THE INVENTION

This invention relates to a process for functionalizing polymers such as polyisobutylene, polypropylene, or ethylene-propylene copolymers etc. More particularly it relates to a novel product functionalized polymer.

BACKGROUND OF THE INVENTION

As is well known to those skilled in the art, polyolefins such as polyisobutylene (PIB) may be functionalized with difficulty because of the hydrocarbon-like non-reactivity toward common chemical reagents. Prior art techniques for functionalizing polyisobutylene include (i) halogenation; (ii) reaction with phosphorus-sulfur compositions, typically $P_2S_5$; (iii) reaction with maleic anhydride in an "ene" reaction; (iv) reaction with activated aromatics, eg phenols; etc. Although other reactions may be used, they are generally characterized by low yield or by the use of expensive reagents.

It is an object of this invention to provide a novel process for improving the dispersancy of lubricating oils. It is another object of this invention to provide a process for functionalizing polymers such as polyisobutylene. Other objects will be apparent to those skilled-in-the-art.

STATEMENT OF THE INVENTION

In accordance with certain of its aspects, the novel process of this invention for functionalizing a polymer which contains a carbon-to-carbon backbone chain and which includes a side chain containing a double bond with an allylic hydrogen atom on the gamma carbon atom may comprise reacting (i) said polymer which contains a carbon-to-carbon backbone chain and which includes a side chain containing an allylic hydrogen atom with (ii) an activated imine in the presence of (iii) a Lewis acid catalyst thereby forming a functionalized polymer characterized by the presence on said side chain of (i) a double bond newly formed between beta and gamma carbon atoms and pendant on said alpha carbon atom (ii) a substituted amino-methyl group; and recovering said functionalized polymer charaterized by the presence of (i) a beta double bond pendent on said alpha carbon atom (ii) a substituted amino-methyl group.

DESCRIPTION OF THE INVENTION

The charge polymers which may be functionalized by the process of this invention include those which have a carbon-to-carbon backbone and preferably a polymer wherein the backbone consists essentially of carbon atoms. These polymers are characterized by the presence of pendant side chains (including end chains) which contain at least one allylic hydrogen atom. The allyl group may commonly be present as a grouping having the configuration

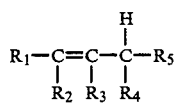  (I)

In this group, the allylic hydrogen is the one shown. Other groups may be present on the carbon atoms. The groups $R_1$ through $R_5$ may be hydrogen or hydrocarbon (typically alkyl groups) and at least one of $R_1$ through $R_5$ is a portion of the polymer backbone. The carbon atom which bears the double bond in I is designated the alpha carbon; the next carbon is designated the beta carbon. The allylic hydrogen is on the gamma carbon.

The allylic hydrogen atom may be on a pendant group or in a terminal position.

In the preferred embodiments, the backbone chain consists essentially of carbon atoms. Such polymers include those derived by polymerization (including copolymerization) of lower olefins and their derivatives including ethylene, propylene, and isobutylene; chloroprene; isobutylene; butadiene; styrene; ethylene-propylene; vinyl chloride; methyl or ethyl acrylate; etc. A preferred polymer may have a backbone chain derived from ethylene, propylene, and third monomer such as norbornene or 1,4-hexadiene, typified by the EPD composition: ethylene-propylene-1,4-hexadiene.

Typical preferred polymers may contain a backbone chain derived from the polymers noted in the following Table:

TABLE (a) EPD terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320;

(b) 1,2-polybutadiene (prepared by polymerizing a butadiene-1,3 in the presence of 15 w % butyl lithium in hexane or tetrahydrofuran at 0° C.–60° C.) having a molecular weight $\overline{M}_n$ of 3,000–20,000;

(c) polypropylene having a molecular weight $\overline{M}_n$ of 500–1500, typically 500–2600, say, 650–995;

(d) polyisobutylene having a molecular weight $\overline{M}_n$ of 300–1900, typically 1300;

(e) a copolymer of ethylene and butylene having a weight $\overline{M}_n$ of 810;

(f) an EPD terpolymer having a molecular weight $\overline{M}_n$ of 3000–30,000, typically 3970–6950, prepared by copolymerizing ethylene, propylene, and 1,4-hexadiene at 0° C.–20° C. in the presence of tri-n-butyl vanadate catalyst and diethyl aluminum choride cocatalyst in n-heptane solvent in the presence of hydrogen. A typical such polymer contains 32 mole % propylene, 2.8 mole % 1,4-hexadiene, and 65.2 mole % ethylene, and has one double bond for each 1000–2000, say 1160–1880 molecular weight units.

The most preferred charge polymer is that derived from polymerization of isobutylene.

These preferred polymers all contain at least one allylic hydrogen atom. The polyethylene polymer may for example be characterized by the formula:

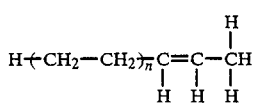

The polyisobutylene may for example be characterized by the formula:

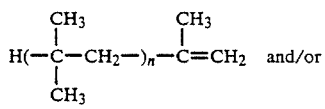

and/or

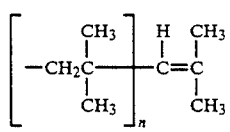

In these and other formulae, the subscript n represents the number of repeating units.

The typical charge polymer may contain 3–9 of the designated allylic groups, say 6 per 100 units of molecular weight $\overline{M}_n$ of terpolymer. In the case of the preferred polyisobutylene of molecular weight $\overline{M}_n$ of 200 –3000, say 1300 there may typically be present one allylic group per molecule of polymer.

The substituted imines which may be used in practice of the process of this invention may be characterized by the formula:

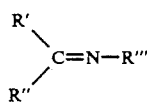

In this formula, the group R''' (and preferably also the groups R' and R'') are electron-withdrawing groups; typical of such groups are —COOR groups, —SO$_3$R groups, —CX$_3$. The preferred group may be —COOR. R' and R'' may be hydrogen, CX$_3$ (where X is halogen, preferably fluorine, chlorine, or bromine), hydrocarbyl typified by phenyl, etc. The electron-withdrawing group may be attached to the nitrogen or the carbon atom shown but preferably it is attached to the nitrogen atoms.

In the above compounds, R, R', and R'' may preferably be a hydrocarbon radical selected from the group consisting of alkyl, aralkyl, cycloalkyl, aryl, alkaryl, alkenyl, and alkynyl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. When R is alkenyl, it may typically be vinyl, allyl, 1-butenyl, etc. When R is alkynyl, it may typically be ethynyl, propynyl, butynyl, etc. R may be inertly substituted i.e. it may bear a non-reactive substituent such as alkyl, aryl, cycloalkyl, ether, halogen, nitro, etc. Typically inertly substituted R groups may include 3-chloropropyl, 2-ethoxyethyl, carboethoxymethyl, 4-methyl cyclohexyl, p-chlorophenyl, p-chlorobenzyl, 3-chloro-5-methylphenyl, etc. The preferred R groups may be lower alkyl, i.e. C$_1$–C$_{10}$ alkyl, groups including, e.g. methyl, ethyl, n-propyl, i-propyl, butyls, amyls, hexyls, octyls, decyls, etc. R may be preferably be n-propyl.

Illustrative imines which may be used in practice of the process of this invention may include:

TABLE

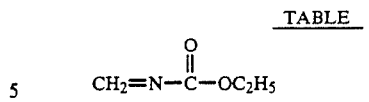

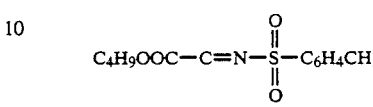

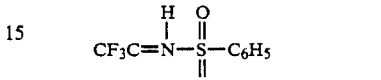

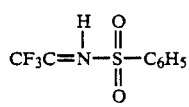

These imines may be available commercially or they may be conveniently prepared in accordance with procedures reported in the literature. See for example
(a) R. Albrecht and G. Kresge, Chem Ber 98 1431 (1965); and
(b) M. P. Cava, C. K. Wilkins, Jr., D. R. Dalton, and K. Bessho J. Org. Chem 30, 3772 (1965).

A preferred imine is the first of those listed in which R' and R'' are hydrogen and R''' is —COOEt viz N-carboethoxymethylene imine. This imine may be prepared in situ (during the functionalization of the polymer) from e.g. methylene diurethane:

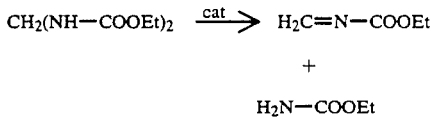

+

H$_2$N—COOEt

The catalyst which may be employed in practice of the process of this invention may be a Lewis Acid typified by the following:

TABLE boron trifluoride etherate
boron trichloride
aluminum tribromide
aluminum trichloride
ferric chloride
antimony pentachloride
zirconium tetrachloride
stannic chloride
antimony trichloride The preferred of these Lewis Acid Catalysts may be boron trifluoride, used as its etherate with ethyl ether.

The reactants may be added to the reaction operation in the following molar parts:

TABLE

| Compound | Broad | Preferred | Typical |
| --- | --- | --- | --- |
| Polymer | 1 | 1 | 1 |
| Imine | 0.1–100 | 0.1–10 | 1 |
| Catalyst | 0.05–10 | 0.05–1 | 0.25 |

Reaction is preferably carried out in batch operation and in liquid phase with agitation at 20° C.–100° C., preferably 50° C.–80° C., say 65° C. at atmospheric pressure for 1–20 hours, preferably 1–8 hours, say 4 hours.

Reaction may be carried out neat or in the presence of 0.5–10 parts, preferably 0.5–3 part, say 1 part of inert diluent-solvent, typified by:

TABLE chloroform
toluene
heptane
xylene

During reaction, the alpha-double bond of the allyl group shifts to the beta position; the double bond of the imine group opens; the allylic hydrogen on the gamma carbon of the allyl group becomes bonded to the nitrogen of the imine; and the carbon (from the C=N portion of the imine) becomes bonded to the alpha carbon of the allyl group: e.g.

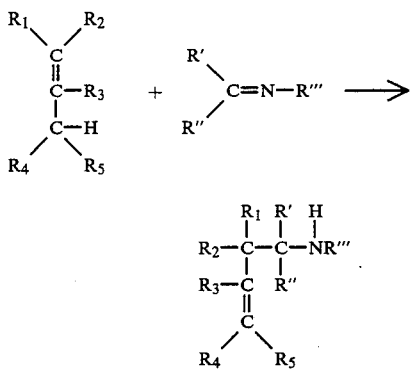

In these illustrative formulae, one of the $R_1$ through $R_5$ groups represents a polymer moiety with which the allyl group is associated.

At the conclusion of the reaction, solvent if present is stripped off, at 20° C.–150° C., preferably 50° C.–100° C., say 100° C. and 0.1–760 mm Hg, preferably 0.1–10 mm Hg, say 5 mm Hg. The product, typically a viscous liquid, is then dissolved in 1–10, preferably 2–3, say 2.5 times in weight of solvent, typically hydrocarbon solvent such as n-heptane. The solution is washed preferably several times with 0.1–10, preferably 0.1–1.0, say 0.5 times its weight of alkanol, preferably methanol.

The resultant product is stripped at 20° C.–200° C., preferably 50° C.–100° C., say 80° C. at 0.1–760- mm Hg, preferably 0.1–10mm Hg, say 5 mm Hg.

It is found that 10–100, preferably 40–80, say 60 mole percent of the allylic groups originally present may be functionalized by addition of the nitrogen-containing moiety. The reaction may readily be followed by the decrease in the 1710/cm$^{-1}$ peak in the IR which represents the carbonyl stretching frequency and by the increase in 3413/cm$^{-1}$ which represents the —NH stretching frequency—in one preferred embodiment.

The product functionalized polymer may typically be a solid or a viscous oil of light color, high solubility in hydrocarbon solvents, and high melting point.

The novel product polymer may be a polymer which bears an imine-derived functional group on at least some of the allylic groups originally present. Commonly it may be found that 10–100, preferably 40–80, say up to 60 mole % of the allylic groups may be functionalized.

The product polymer may be characterized by the presence of at least one (1-aminoethyl) propen-2-yl group where the amino group bears an electron withdrawing group. This group may have the formula:

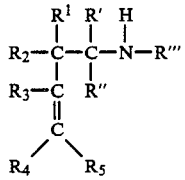

wherein R', R'', and R''' are as noted supra.

In the preferred embodiment, the group may be designated either as a [1-(substituted-amino) mono- or di-substituted methyl] propen-2-yl group or a [1-(substituted-aminomethyl)] propen-2-yl group.

Typical products may be the following:

TABLE (a) EPD terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320 and which now contains pendent amine groups derived from the imine;

(b) 1,2-polybutadiene (prepared by polymerizing butadiene-1,3 in the prsence of 15 w % butyl lithium in hexane or tetrahydrofuran at 0° C.–60° C.) having a molecular $\overline{M}_n$ of 3,000–20,000 and which now contains pendent amine groups derived from the imine;

(c) polypropylene having a molecular weight $\overline{M}_n$ of 500–1500, typically 500–2600, say 650–995 and which now contains pendent amine groups derived from the imine.

(d) polybutylene having a molecular weight $\overline{M}_n$ of 300–1900, typically 1300 and which now contains pendant amine groups derived from the imine;

(e) a copolymer of ethylene and butylene having a molecular weight $\overline{MHD}$ n of 810 and which now contains pendant amine groups derived from the imine;

(f) an EPD terpolymer having a molecular weight $\overline{MHD}$ n of 3000–30,000, typically 3970–6970, prepared by copolymerizing ethylene, propylene, and 1,4-hexadiene at 0° C.–20° C. in the presence of tri-n-butyl vanadate catalyst and diethyl aluminum chloride cocatalyst in n-heptane solvent in the presence of hydrogen (typically such a polymer contains 32 mole % propylene-derived units, 2.8 mole % 0,4-hexadiene-derived units, and 65.2 mole % ethylene-derived units and which now contains pendant amine groups derived from the imine.

A preferred product of the process of this invention may be that prepared from polyisobutylene ($\overline{M}_n$ of 1290) which has been reacted with the nitrogen substituted acyl-imine CH$_2$=N-COOEt (the later derived by splitting methylene diurethane in situ) and which has a molecular weight $\overline{M}_n$ of 1330, and contains 0.37 wt. % nitrogen corresponding to the addition of nitrogen-containing imine-derived moieties at 40% of the allylic double bonds originally present in the polymer.

A typical product polymer molecule may have the formula

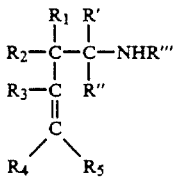

In the case of a preferred polyisobutylene-derived product, a typical product may be characterized by the formula

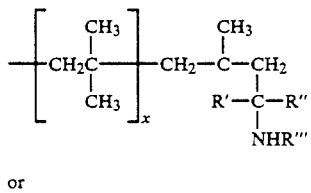

or

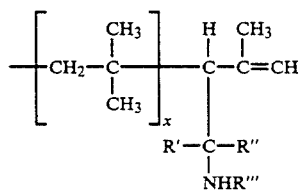

wherein x is 5–300, say 25, and the product has a molecular weight $\overline{M}_n$ of 300–17,000, say 1400.

The polymer composition useful in practice of the process of this invention may contain a wide range of pendant groups in the molecule.

Where it is desired to utilize the product in an oil system, the number of pendant groups may typically be one for each 300–10,000 molecular weight units, preferably one for each 1000–5000 molecular weight units, say one for each 1800 molecular weight units. The greatest solubility in lube oil systems may be achieved when the polymer base has a molecular weight $\overline{M}_n$ of 300–15,000.

Another preferred polymer composition used in practice of the invention may be derived from polymers of ethylene-propylene-third monomer-most preferably from a terpolymer of ethylene-propylene-1, 4-hexadiene which, when prepared by the process of this invention may have the following repeating groups in the polymer chain:

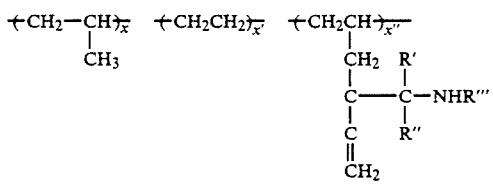

wherein x, x', and x'' may be integers.

Such a polymer may typically contain 40 mole %–80 mole % derived from ethylene, 20 mole %–60 mole % derived from propylene, and 0.1 mole %–5 mole % derived from third monomer.

These novel reaction products of a polymer and an imine, which are characterized by the presence of amine functionality, may generally be used in the same manner and for the same purposes as the unfunctionalized polymers. In these uses, the system may be benefited by the presence of the amine functionality. For example, the amine-functionalized polymer wherein the backbone is derived from a polyisobutylene or a polypropylene moiety may (as such or after hydrogenation) be used as blending agents in lubricating oils or in motor fuels. Clearly the use in motor fuels may be more desirable when the backbone is of lower molecular weight, e.g. derived from diisobutylene or trimers or tetramers; and use in lubricating oils may be more desirable for the polymers of high molecular weight, e.g. 1000 up to say 10,000 or more.

These materials may also be used as adhesives, bonding agents, or laminating agents either alone or in admixture with other resins such as coumarone-indene resins, polystyrenes, etc. They may also be used as reactant in a wide variety of systems to produce products which are useful as additives. For example, the typical polyisobutylene-derived polymer bearing amine functionality may be reacted with (i) phenols to give antioxidants or with (ii) maleic acid anhydride to give amine-substituted polyisobutylene-succinic acid anhydride type derivatives which are useful as surface active agents and as additives to lubricating oils or motor fuels.

These novel products may find particular use as additives to lubricating oils, petroleum base or synthetic (e.g. ester type such as polyester oils); it may be found that by presence of these novel compounds, the dispersancy of such oils may be improved.

Commonly these products may be useful in the form of concentrates containing 10–70 parts, preferably 20–60 parts, say 50 parts of polymer per 30–90 parts, preferably 20–80 parts, say 50 parts diluent-solvent. Inert diluent-solvents may include hydrocarbons such as toluene, and more preferably oils including lubricating oils—synthetic or petroleum based. A typical concentrate may include 35 parts of the novel polymer in 65 parts of 100 E Pale Stock HF (a paraffinic distillate oil 39 SUS viscosity at 210° F.) lubricating oil.

In accordance with certain of its aspects, the lubricating oils which may be improved by use of the products of this invention may include various lubricating oils such as hydrocarbon oils derived from petroleum or synthetically prepared lubricating oils.

Natural oils may include mineral oils such as those obtained from petroleum, including distillate and residual lubricating oils. Typical of these may be:

1. An SAE 10 Mid-continent, solvent refined lubricating oil with the following flow properties:

| | |
|---|---|
| Viscosity at 210° F. SUS | 44 |
| Viscosity at 100° F. SUS | 168 |
| Viscosity Index | 91 |

2. An SAE 30 Pennsylvania type lubricating oil with the following flow properties:

| | |
|---|---|
| Viscosity at 210° F. SUS | 65 |
| Viscosity at 100° F. SUS | 500 |
| Viscosity Index | 103 |

3. An SAE 30 Naphthenic solvent-refined lubricating oil with the following properties:

| | |
|---|---|
| Viscosity at 210° F. SUS | 58 |
| Viscosity at 100° F. SUS | 510 |

-continued

| Viscosity Index | 62 |
| --- | --- |

Other such oils useful in the practice of this invention are well-known in those skilled in the art.

The synthetic lubricating oils which may be improved by use of this invention may include liquid high molecular weight esters, fluorocarbons, polyethers, polysilicones, etc.

Typically, the synthetic oil may be an ester formed by the reaction of (a) a $C_3$-$C_{30}$ aliphatic acid $R^2(COOH)_n$ is an aliphatic hydrocarbon (including inertly-substituted hydrocarbon) residue and n is typically 1-3, preferably 1, with (b) a $C_4$-$C_{20}$ aliphatic alcohol $R^3(OH)_m$ wherein $R^3$ is an aliphatic hydrocarbon (including inertly-substituted hydrocarbon) residue and m is an integer, preferably 1-6, more preferably 1-4, most preferably 3-4.

The base oil may, in one embodiment, be a liquid ester product of an aliphatic monocarboxylic acid and a polyol. The preferred of these acids may contain 5-36 carbon atoms. Illustrative of such acids may be:

| valeric | $C_5$ |
| --- | --- |
| pivalic | $C_5$ |
| dodecanoic | $C_{12}$ |
| stearic | $C_{18}$ |
| eicosanoic | $C_{20}$ |
| triacontanoic | $C_{30}$ |
| hexatriacontanoic | $C_{36}$ |

More preferably, $C_6$-$C_{10}$ acids may be used. Typical of such acids may be:

| caproic acid | $C_6$ |
| --- | --- |
| capric acid | $C_{10}$ |
| enanthic acid | $C_7$ |
| pelargonic acid | $C_9$ |
| 2-ethylhexanoic acid | $C_8$ |

The most preferable, however, are enanthic and pelargonic acids.

The polyols which may be reacted with the noted aliphatic monocarboxylic acids, to form esters, may include $R^3(OH)_m$ wherein $R^3$ is an aliphatic hydrocarbon moiety and m is an integer preferably 2-6, more preferably 2-4. The preferred polyols may be the $C_2$-$C_{10}$, say $C_2$-$C_4$ polyols. Typical of such polyols may be:
neopentylglycol
trimethylol ethane
trimethylol propane
trimethylol butane
pentaerythritol
dipentaerythritol
The preferred glycol may be pentaerythritol.

Typical esters of aliphatic monocarboxylic acids and polyols may be $R^3(OCOR^2)_m$ including the following illustrative examples:
pentaerythritol tetra-valerate
pentaerythritol tetra-caproate
pentaerythritol tetra-pelargonate
dipentaerythritol hexa-valerate
dipentaerythritol hexa-pelargonate
dipentaerythritol hexa-caproate
trimethylol propane tri-caproate
trimethylol propane tri-butyrate
trimethylol propane tri-valerate
trimethylol propane tri-pelargonate A preferred ester may be pentaerythritol tetra-caproate.

In another embodiment, the liquid synthetic ester may be the product of reaction of an aliphatic polycarboxylic acid and aliphatic monohydroxy alcohol.

Preferably, the aliphatic polycarboxylic acid may have the formula $R^2(COOH)_n$, wherein n is greater than 1 and preferably 2-3. Typical polycarboxylic acids may include:
adipic acid
azelaic acid
sebacic acid
dodecanedioic acid
succinic acid
1,2,4 butane tricarboxylic acid Preferred acids may be adipic acid and azelaic acid.

Preferably the alcohol may have the formula $R^3OH$ where $R^3$ may be a saturated aliphatic group which may be inertly substituted. Typical alcohols may include methanol, n-butanol, 2-ethyl-n-butanol, pentanol, 1-hexanol, 2-ethylhexanol, 1-decanol, 2-ethyl-octanol, and 2-ethoxy ethanol.

Specific illustration of this type of synthetic ester lubricating oils which may be used in this invention are:
di-2-ethylhexyl sebacate
di-2-ethylhexyl ozelate
di-2-ethylhexyl adipate
di-n-amyl sebacate
di-2-ethyl octyl succinate
di-2-ethoxyethyl sebacate
di-2-ethyl octyl adipate
di-2-ethyl octyl azelate
tri-pentyl-1,2,4 butane carboxylate Preferred esters may be di-2-ethylhexyl azelate and di-2-ethylhexyl adipate.

These oils may be blended with other synthetic esters as noted supra or with other oils, such as castor oil, lard oil, polymerized olefins, copolymers of alkylene glycols or aliphatic alcohols with organic acids, etc.

The lubricant compositions of the present invention may contain other additives, typically present in amount of 0.001-10 wt.%, including:
 a. oxidation inhibitors such as aromatic amines e.g., phenothiazine;
 b. metal corrosion inhibitors such as benzotriazole;
 c. metal passivating and load-carrying agents, such as tricresyl phosphate;
 d. anti-foamants such as silicone, etc.

Although the preferred compositions of this invention may be lubricating oils characterized by improved dispersancy and/or by improved viscosity index, it is a feature of this invention that the additives disclosed herein may permit attainment of improvements in crude oils, in residual oils, in reduced crudes, in fuel oils, in distillates, in wax-containing compositions, etc.

In practice of this invention, the preferred composition may contain a dispersing amount of the novel product. Typically this dispersing amount may be 0.1-10 parts, preferably 1-4, say 2 parts of product per 100 parts of oil.

In the case of lubricating oils, the novel polymer product may commonly impart improved viscosity index, and the viscosity index improving amount may be 0.1-10, preferably 0.5-3, say 1.6 parts of polymer per 100 parts of oil. They may be used alone or in combination with other dispersing agents or viscosity index improving agents.

The dispersant properties of the additive of this invention may be tested for its effectiveness in mineral lubricating oil compositions in the Bench V-C Test.

The Bench V-C Test is conducted by heating the test oil mixed with a synthetic hydrocarbon blowby and a diluent oil ar a fixed temperature for a fixed time period. After heating, the turbidity of the resultant mixture is measured. Ratings of 0–100 are assigned. A lower number is an indication of an improvement in dispersancy.

Viscosity index of lubricating oils may be measured in standard manner; and improvement in viscosity index of 30–50 units may be common.

Practice of the process of this invention may be apparent to those skilled in the art from inspection of the following examples wherein, as elsewhere in the specification, all parts are parts per weight unless otherwise stated. In the examples, as elsewhere, unfilled valence bonds may be filled with hydrogen atoms.

DESCRIPTION OF SPECIFIC EMBODIMENT

Example I

Preparation of Methylenediurethane

2 H$_2$N-COOEt+HCHO
→CH$_2$(NH-COOEt)$_2$+H$_2$O

There is added to a one-liter flask:
(i) 89 g (1 mole) urethane in 500 ml water;
(ii) 40.5 g (0.5 moles) 37% aqueous formaldehyde; and;
(iii) 1.5 g (0.02 moles) concentrated hydrochloric acid as catalyst.

The solution is maintained overnight, as crystals form. Crystals (76 grams), representing a 40% yield are obtained by filtering; and cooling of the mother liquor gives additional crystals to increase the yield to 85% of product which is identified by NMR and melting point.

Example II

CH$_2$(NH
    COOEt)$_2$→H$_2$C=NCOOEt + +H$_2$N-COOEt

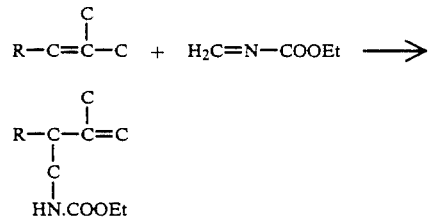

In this example, there is added to a 500 ml flask:
(i) 100 g (0.078 moles) of Indopol H-300 brand of polyisobutylene (M$_n$ of 1290);
(ii) 14.8 g [0.078 moles] of methylene diurethane;
(iii) 100 ml chloroform; and '(iv) 3.1 g boron trifluoride BF$_3$ etherate The reaction mixture is refluxed 4 hours and then stripped under vacuum. The product is then dissolved in 200 ml heptane, washed twice with 50 ml aliquote of anhydrous methanol, and stripped under vacuum.

The product is found to have a molecular weight $\overline{M}_n$ of 1330 and a nitrogen content of 0.37%. By chromatography, it is determined that 40% of the allylic groups are converted to nitrogen-containing groups. The major product corresponds to:

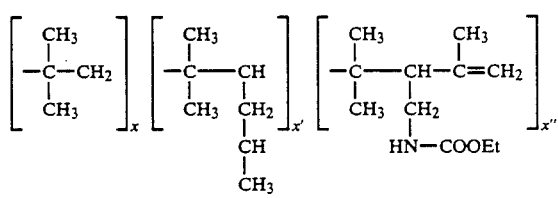

Results comparable to Example II, may be attained if the charge polymer is

TABLE

| Example | Charge Polymer |
|---|---|
| III | Propylene tetramer |
| IV | Polyisobutylene $\overline{M}_n$ of 2000 |
| V | EPD terpolymer ($\overline{M}_n$ of 68,000) of ethylene-propylene-1,4-hexadiene |

It will be noted that polymers which contain no allylic group as characterized supra, are not functionalized by the process of this invention, e.g.:

TABLE

| Example | Polymer |
|---|---|
| VI* | Hydrogenated polyisobutylene of $\overline{M}_n$ of 1290. |

Example VII–VIII

In this example, the product of Example II is added to a standard lubricating oil.

The lubricating oil plus the product of Example II is tested for dispersancy. The results are as follows:

| Example | Additive Parts | Bench V-C Rating |
|---|---|---|
| VII | None | 100 |
| VIII | 6 w % | 96 |

From the above, it is apparent that the product of this invention shows evidence of dispersing ability in lubricating oils.

Although this invention has been illustrated by reference to specific embodiments, it will be apparent to those skilled in the art that various changes and modification may be made which clearly fall within the scope of this invention.

We claim:

1. The method of functionalizing a polymer which contains a carbon-to-carbon backbone chain and which includes a side chain containing a double bond with an allylic hydrogen atom on the gamma carbon atom which comprises reacting (i) said polymer which contains a carbon-to-carbon backbone chain and which includes a side chain containing an allylic hydrogen atom with (ii) an activated imine in the presence of (iii) a Lewis acid catalyst thereby forming a functionalized polymer characterized by the presence on said side chain of (i) a double bond newly formed between the beta and gamma carbon atoms and pendant on said alpha carbon atom (ii) a substituted amino-methyl group; and recovering said functionalized polymer characterized by the presence of (i) a beta double bond and pendant on said alpha carbon atom (ii) a substituted amino-methyl group.

2. The method of claim 1 wherein said polymer is selected from the group consisting of polymers or copolymers of isobutylene
chloroprene
butadiene
styrene
ethylene-propylene
ethylene-propylene-norbornene
ethylene-propylene-1,4-hexadiene
ethylene-propylene-dicloheptadiene
vinyl chloride
methyl acrylate and
ethyl acrylate 3. The method of claim 1 wherein said polymer is a polyolefin.

4. The method of claim 1 wherein said polymer is polyethylene.

5. The method of claim 1 wherein said polymer is polypropylene.

6. The method of claim 1 wherein said polymer is polyisobutylene.

7. The method of claim 1 wherein said polymer is polyisobutylene of molecular weight $\overline{M}_n$ of 300-1900.

8. The method of claim 1 wherein said substituted imine is characterized by the formula $$\begin{array}{c} R' \\ \phantom{R'}\diagdown \\ \phantom{RRR}C=N-R''' \\ \phantom{R'}\diagup \\ R'' \end{array}$$

wherein at least one of R', R'', and R''' is an electron withdrawing group.

9. The method of claim 8 wherein said electron withdrawing groups are each selected from the group consisting of —SO$_3$H, —COOR and —CX$_3$ wherein R is alkyl, alkaryl, aryl, aralkyl, or cycloalkyl, R' and R'' are hydrogen and X is halogen.

10. The method of claim 8 wherein R' and R'' are hydrogen.

11. The method of claim 1 wherein said imine is selected from the group consisting of:

$$CH_2=N-\overset{\overset{\displaystyle O}{\|}}{C}-OC_2H_5$$

$$C_6H_5-\overset{\overset{\displaystyle H}{|}}{C}=N-\overset{\overset{\displaystyle O}{\|}}{C}-O-C_2H_5$$

$$C_4H_9OOC-\overset{\overset{\displaystyle H}{|}}{C}=N-\overset{\overset{\displaystyle O}{\underset{\underset{\displaystyle O}{\|}}{\|}}}{S}-C_6H_4-CH_3, \text{ and}$$

$$CF_3\overset{\overset{\displaystyle H}{|}}{C}=N-\overset{\overset{\displaystyle O}{\underset{\underset{\displaystyle O}{\|}}{\|}}}{S}-C_6H_5$$

12. The method of claim 1 wherein said imine is $$CH_2=N-\overset{\overset{\displaystyle O}{\|}}{C}-OC_2H_5$$

13. The method of claim 1 wherein said imine is $$CH_2=N-\overset{\overset{\displaystyle O}{\|}}{C}-OC_2H_5$$

prepared in situ by decomposition of CH$_2$(NHCOOC$_2$H$_5$)$_2$.

14. The method of claim 1 wherein said Lewis Acid catalyst is selected from the group consisting of BF$_3$ etherate
BCl$_3$
AlBr$_3$
AlCl$_3$
FeCl$_3$
SbCl$_5$
ZrCl$_4$
SbCl$_3$ and
SnCl$_4$ 15. The method of claim 1 wherein said Lewis Acid catalyst is BF$_3$ etherate.

16. The method of functionalizing a polyolefin polymer which contains a carbon-to-atom backbone chain and which includes a side chain containing a double bond with an allylic hydrogen atom on the gamma carbon atom which comprises reacting (i) said polyolefin polymer which contains a carbon-to-atom backbone chain and which includes a side chain containing a double bond with an allylic hydrogen atom on the gamma carbon atom with (ii) an activated imine $$\begin{array}{c} R' \\ \phantom{R'}\diagdown \\ \phantom{RRR}C=N-R''' \\ \phantom{R'}\diagup \\ R'' \end{array}$$

wherein R' R'' R''' are hydrogen or alkyl, aryl, aralkyl or cycloalkyl hydrocarbon groups and at least one of R', R'', and R''' is an electron withdrawing group in the presence of a Lewis acid catalyst selected from the group consisting of BF$_3$ etherate, BCl$_3$, AlBr$_3$, AlCl$_3$, FeCl$_3$, SbCl$_5$, ZrCl$_4$, SbCl$_3$, and SnCl$_4$ thereby forming a functionalized polyolefin polymer characterized by the presence on said side chain of (i) a double bond newly formed between the beta and gamma carbon atoms and pendant on said alpha carbon atom (i) a substituted amino-methyl group; and recovering said functionalized polyolefin polymer characterized by the presence of (i) a beta double bond and pendant on said alpha carbon atom (ii) a substituted amino-methyl group.

17. The method of claim 16 wherein said polyolefin polymer is polyisobutylene of $\overline{M}_n$ of 300-1900.

* * * * *